No. 640,980. Patented Jan. 9, 1900.
C. M. WILLIAMS.
ANIMAL TRAP.
(Application filed Jan. 4, 1899.)
(No Model.)
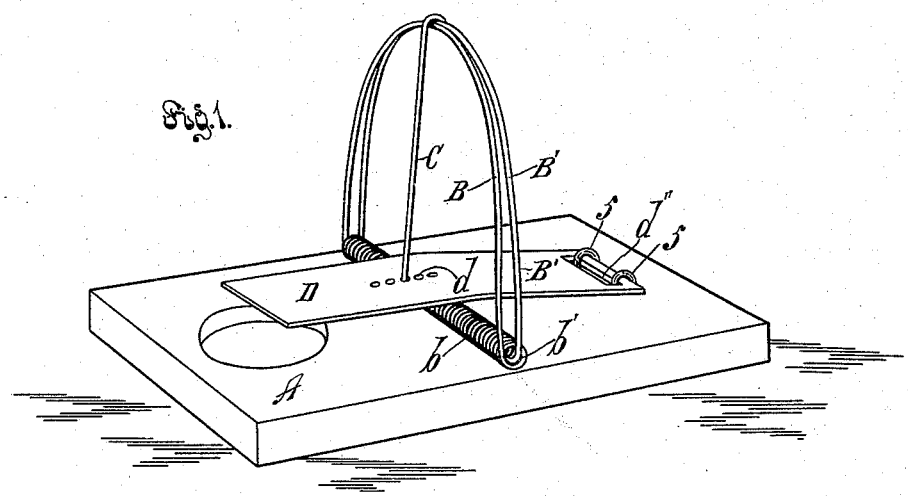
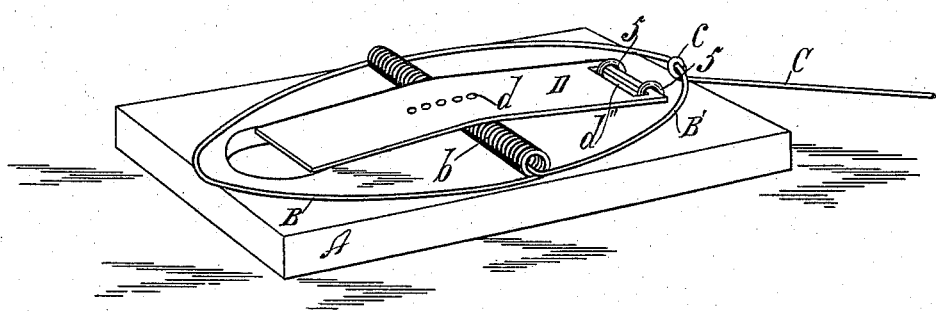
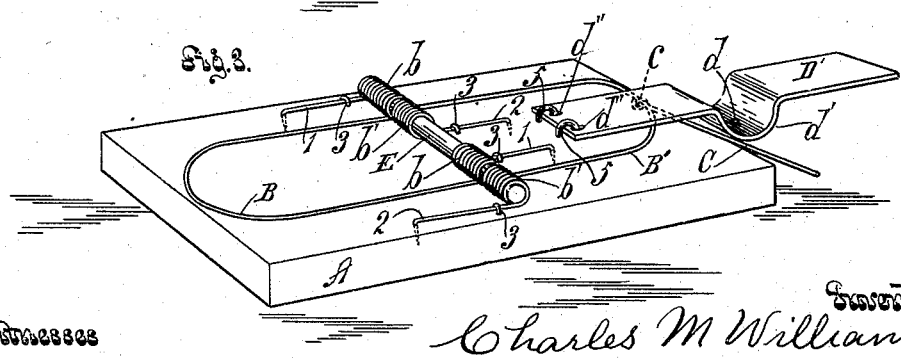
Witnesses
George Kingman.
S. Townsend
Inventor
Charles M Williams
by Townsend Bros
his Attys

UNITED STATES PATENT OFFICE.

CHARLES M. WILLIAMS, OF LOS ANGELES, CALIFORNIA, ASSIGNOR TO THE STAR NOVELTY COMPANY, OF SAME PLACE AND PHŒNIX, ARIZONA TERRITORY.

ANIMAL-TRAP.

SPECIFICATION forming part of Letters Patent No. 640,980, dated January 9, 1900.

Application filed January 4, 1899. Serial No. 701,154. (No model.)

*To all whom it may concern:*

Be it known that I, CHARLES M. WILLIAMS, a citizen of the United States, residing at Los Angeles, in the county of Los Angeles and State of California, have invented a new and useful Animal-Trap, of which the following is a specification.

The object of my invention is to provide a superior trap of few and inexpensive parts and which trap can be more easily set than former traps; also, to provide a trap which will be sprung by the animal whenever the animal approaches from either direction.

Another object of my invention is to provide a trap of the character above stated in which the striking parts are condensed into as small space as possible and so constructed and arranged as to present as little appearance of danger as possible, so that the animal will not be warned away.

The accompanying drawings illustrate my invention.

Figure 1 is a perspective view of my trap set. Fig. 2 is a perspective view of the trap sprung. Fig. 3 shows another form of the trap. In this view the trip is thrown back to expose the jaw-operating springs.

A indicates a base for the trap; B B', two looped jaws with their bases set together. $b\ b'$ indicate springs at the bases of the jaws to normally press the jaws down upon the base. The jaws are preferably made of spring-wire and the springs are preferably coils of wire, being continuations of the wires which form the jaws. These are fastened to the base by extensions 1 2, the ends of which are inserted into the base and the bodies held in place by staples 3. It is to be understood, however, that any form of spring for pressing the jaws down may be employed without departing from the spirit of my invention.

C indicates the trigger, which is hinged to one of the jaws, as at $c$. Preferably the hinge is formed by a loop at the apex of the jaw B' and an eye at the end of the trigger C.

D indicates the trigger-trip, which is hinged to the base A and extends across the space between the jaws and is provided with one or more catches, as at $d$, for the end of the trigger C. Preferably the plate D has a bend or offset, as at $d'$, to chamber a pin E, which is passed through the spring-coils at the axis of the jaws, thus allowing the trip to lie close to the base A.

In practice to set the trap the two jaws are brought into raised position, as shown in Fig. 1, and the trigger C is brought over the jaw B and the end is brought down close to the trip D, which is raised slightly to bring the catch $d$ to hold the end of the trigger. Then the trap is set for use. Any animal approaching the trigger C and contacting with or resting his foot upon the trip D will withdraw the catch from the trigger C, and both jaws are thrown down simultaneously by the springs $b\ b'$, thus catching the animal. By preference the trip-plate D has one or more holes $d''$ near one end, through which are inserted legs of the staples 5, which are driven into the base to hinge the trip to the base. Before setting the trap the trigger C may be inserted through a small piece of cheese or any other tempting morsel to tempt the animal, or the trap may be set in any run of the animal, so that the animal in passing will touch the trip-plate.

The wire loops, which form the jaws, are preferably of the same width, and in Fig. 3 a novel arrangement of the coiled springs is shown. The coils $b$ of the jaw B are arranged at the left of their respective limbs of said jaw, while the coils of the jaw B' are arranged at the right of the respective limbs of their jaw, and the pin E is inserted through all four coils. By this arrangement like limbs of the jaws are brought together and the springs are arranged symmetrically on each side of the trap and on each side of the limbs of the jaws, as shown.

Since the trigger-trip consists of a plate hinged at one end and extending substantially equidistant beyond the opposite sides of the jaws when they are in the set position, (the hole or holes for the trigger being at the middle of the plate,) the trip will be sprung by the animal approaching from either direction.

Now, having described my invention, what I claim as new, and desire to secure by Letters Patent, is—

1. In a trap the combination set forth of a base; two looped jaws with their bases set together; springs to hold the jaws normally against the base; a trigger hinged to one of the jaw-loops and adapted to extend down over the other jaw-loop when the two loops are brought together in a raised position; and a trigger-trip hinged to the base and provided with a catch to hold the end of the trigger when the trap is set.

2. A trap comprising a base; two spring-pressed jaws fastened to the base with their bases near together; a trigger hinged to one of the jaws and arranged to extend down over the other jaw when the jaws are brought together; and a trigger-trip hinged to the base and extending across the axis of the jaws and provided with a catch for the end of the trigger.

3. A trap comprising a base; two jaws each provided with coil-springs at its base fastened to the trap-base to press the jaws respectively against the trap-base at the opposite ends thereof respectively; a trigger hinged to one of the jaws and arranged to extend down over the other jaw to hold the jaws in set position; a trigger-trip hinged to the base and provided at its mid-length with a bend to extend over the springs and also provided with a catch to hold the trigger when the trap is in its set position.

4. A trap comprising a base; two jaws each provided at the opposite sides of its base with a coiled spring; a pin extending through both the coils of both of said springs, said springs being fastened to the base to press the jaws against the base on opposite sides of the axis of the jaws; and a trigger-trip hinged to the base and extending over the pin and provided with one or more catches to hold the trigger when in its set position.

CHAS. M. WILLIAMS.

Witnesses:
 JAMES R. TOWNSEND,
 I. TOWNSEND.